L. W. ERWAY.
AEROPLANE.
APPLICATION FILED OCT. 6, 1917.
1,273,166.
Patented July 23, 1918.
2 SHEETS—SHEET 1.
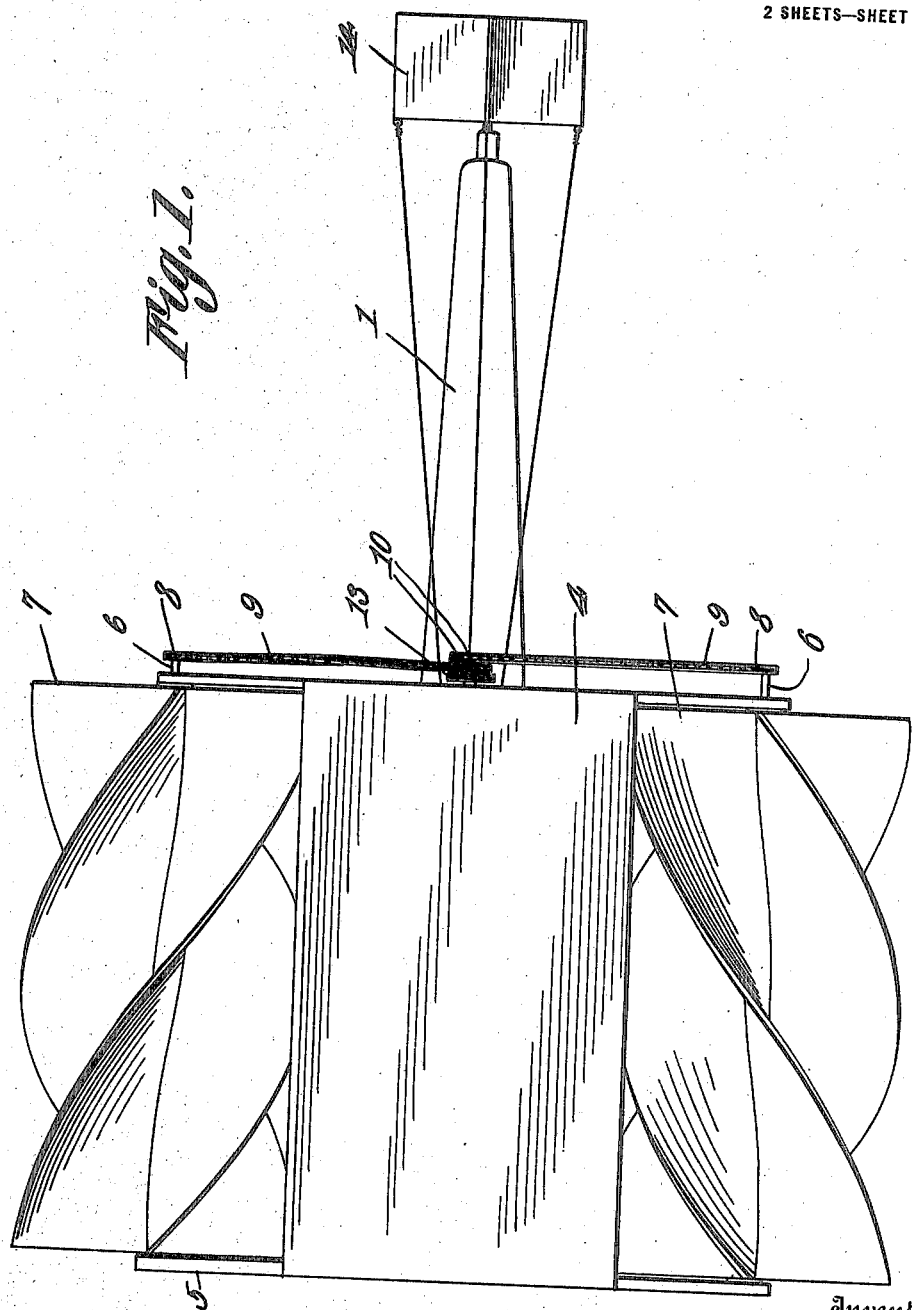
Witness
Inventor,
L. W. Erway
By
Attorneys

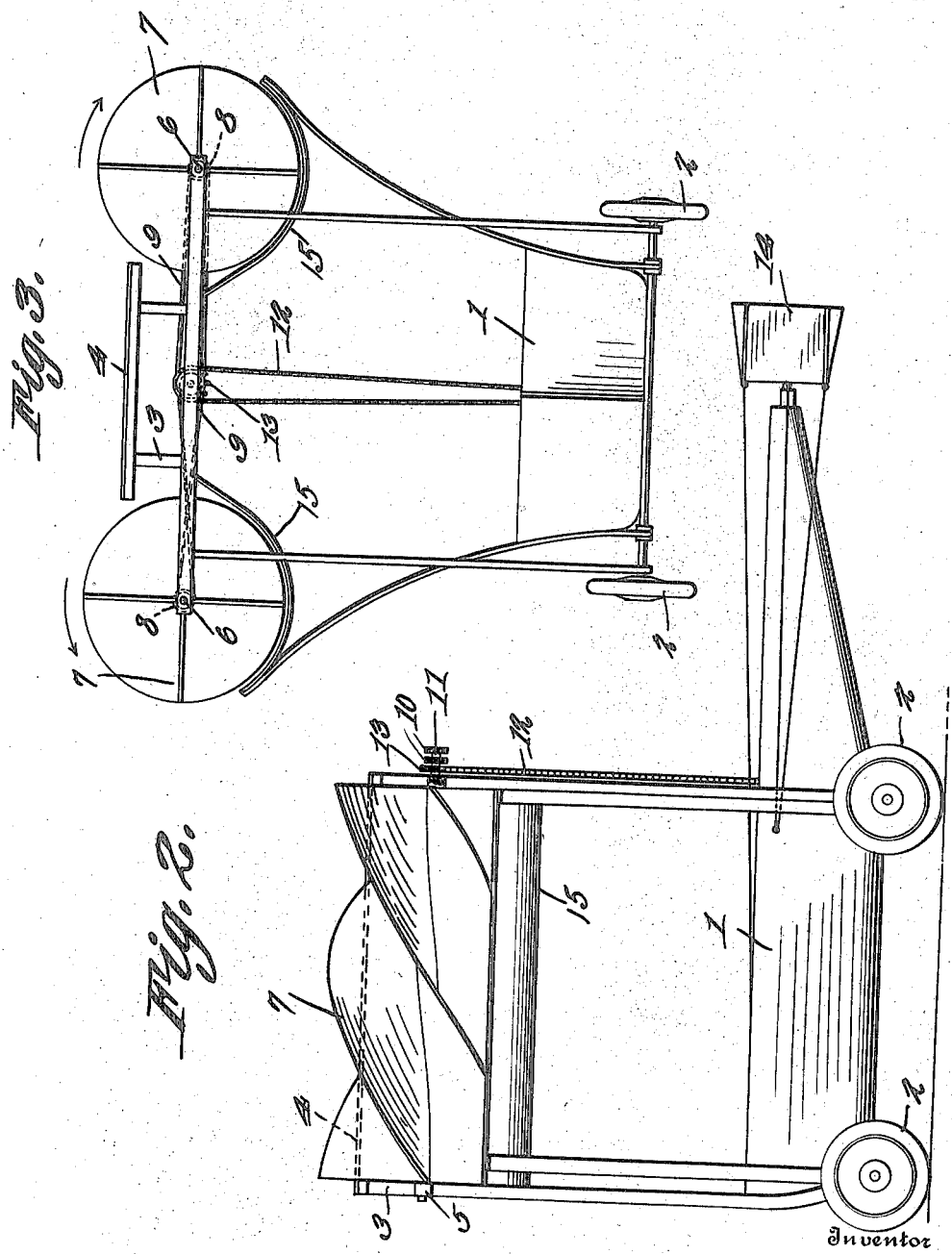

UNITED STATES PATENT OFFICE.

LOUIS W. ERWAY, OF HASTINGS, MICHIGAN.

AEROPLANE.

1,273,166.

Specification of Letters Patent. Patented July 23, 1918.

Application filed October 6, 1917. Serial No. 195,116.

*To all whom it may concern:*

Be it known that I, LOUIS W. ERWAY, a citizen of the United States, residing at Hastings, in the county of Barry and State of Michigan, have invented a new and useful Aeroplane, of which the following is a specification.

This invention relates to aeroplanes or machines of the heavier than air type, one of the objects of the invention being to provide a machine utilizing an extensive sustaining plane provided at its sides with propelling screws which operate both to move the machine forwardly and to displace air from above the sustaining plane and direct it under said plane, thereby to create a partial vacuum above the plane and facilitate the ascent of the machine and at the same time drive the plane upwardly.

A still further object is to provide propelling screws which not only operate to remove air from above the sustaining plane and direct air under said plane but also to displace air downwardly, thus to elevate the machine.

With the foregoing and other objects in view, which will appear as the description proceeds the invention resides in the combination and arrangement of parts and in the details of construction hereinafter described and claimed it being understood that changes in the precise embodiment of the invention can be made within the scope of what is claimed, without departing from the spirit of the invention.

In the accompanying drawings the preferred form of the invention has been shown.

In said drawings:—

Figure 1 is a plan view of a machine embodying the present improvements.

Fig. 2 is a view partly in side elevation and partly in section.

Fig. 3 is a front elevation.

Referring to the figures by characters of reference 1 designates the fuselage of the airship, the same having any suitable running gear 2 and mounted above the fuselage and connected thereto by struts 3 is a sustaining plane 4.

Extending laterally from the fuselage at each side are bearing arms 5 and journaled in the outer end portions of these arms are longitudinal shafts 6 which are parallel. Fixedly secured to each of these shafts is a propelling screw having broad blades as indicated at 7, each screw in the present instance being provided with four of these spiral blades although it is to be understood that the number of blades may be increased or diminished as preferred. Likewise, while only one propelling screw has been shown at each side of the machine it is to be understood that this number may be multiplied.

The screws extend slightly above the sustaining plane 4 although the greater portions thereof are located below the frame.

Any suitable means may be provided for simultaneously rotating the screws in opposite directions, respectively, said screws being adapted to revolve as indicated by the arrows in Fig. 3.

The means for driving the screws includes a sprocket 8 secured to the shaft 6 and driven, by chains 9 from sprockets 10 secured to a shaft 11 journaled under the sustaining plane 4. This shaft 11, in turn, may be driven from a motor, not shown, through a chain 12 to a sprocket 13.

It is to be understood that one of the chains 9 must be crossed in order to insure rotation of the screws in opposite directions respectively.

The machine may be provided with any suitable steering mechanism as indicated generally at 14.

When the machine is in operation the broad bladed screws will not only operate to move the machine forwardly, thus presenting the bottom surface of the sustaining plane to the atmosphere but will also displace air downwardly, the outwardly moving portions of the blade pulling air from above the sustaining plane 4, thus to create a partial vacuum while the inwardly moving portions of the blade will shift air inwardly and upwardly under the sustaining plane 4 thereby to assist in the elevation of the machine.

If desired shields 15 may be arranged under the inner portions of the screws to prevent positively any withdrawal of air by the screws from under the plane.

What is claimed is:—

An airship including a sustaining plane, a propelling screw extending under and upwardly and outwardly beyond each side of the sustaining plane, and means for simultaneously rotating the screws at opposite sides of the sustaining plane in opposite directions respectively, said screws having a plurality of broad blades constituting means for displacing air laterally from above the sustaining plane, inwardly under the sustaining plane and downwardly.

In testimony that I claim the foregoing as my own, I have hereto affixed my signature in the presence of two witnesses.

LOUIS W. ERWAY.

Witnesses:
A. M. ANDERSON,
A. E. MULHOLLAND.